United States Patent [19]

Hannel

[11] Patent Number: 4,805,475
[45] Date of Patent: Feb. 21, 1989

[54] ANTI-BACKLASH GEAR ASSEMBLY

[75] Inventor: Clifford L. Hannel, Los Angeles, Calif.

[73] Assignee: Lockheed Corporation, Calabasas, Calif.

[21] Appl. No.: 74,660

[22] Filed: Jul. 17, 1987

[51] Int. Cl.⁴ .................. F16H 55/04; F16H 55/18
[52] U.S. Cl. ........................................ 74/440; 74/409
[58] Field of Search .............................. 74/409, 440

[56] References Cited

U.S. PATENT DOCUMENTS

| | | | |
|---|---|---|---|
| 95,757 | 10/1869 | Babcock et al. | 74/440 |
| 95,758 | 10/1869 | Barton | 74/440 |
| 272,940 | 2/1883 | Bergh | 74/440 |
| 792,964 | 6/1905 | Cahen | 74/440 |
| 1,124,107 | 1/1915 | Bugatti | 74/409 |
| 1,493,827 | 5/1924 | Stankey | 74/440 |
| 2,382,846 | 8/1945 | Barber | 74/306 |
| 2,679,167 | 5/1954 | Nichinson | 74/409 |
| 2,703,497 | 3/1955 | Townsend | 74/399 |
| 2,880,625 | 4/1959 | Thomas | 74/440 |
| 3,803,936 | 4/1974 | Kroeper | 74/409 |
| 4,072,064 | 2/1978 | Lloyd | 74/409 |
| 4,305,307 | 12/1981 | Kiunke | 74/409 |
| 4,473,317 | 9/1984 | Bolang | 403/359 |
| 4,582,360 | 4/1986 | Becker | 297/362 |
| 4,663,941 | 5/1987 | Louradour et al. | 74/440 |

FOREIGN PATENT DOCUMENTS

| | | | |
|---|---|---|---|
| 723916 | 4/1932 | France | 74/440 |
| 217041 | 10/1985 | Japan | 74/409 |
| 575444 | 10/1977 | U.S.S.R. | 74/409 |
| 1276870 | 12/1986 | U.S.S.R. | 74/440 |

Primary Examiner—Leslie A. Braun
Assistant Examiner—Scott Anchell
Attorney, Agent, or Firm—Louis L. Dachs

[57] ABSTRACT

The invention is an anti-backlash gear assembly comprising a first gear rotatably mounted to a shaft incorporating a first slot partially therethrough which is aligned with the longitudinal axis of the shaft. A second gear is rotatably mounted to the shaft and has a second slot extending completely therethrough which is alignable with the first slot. First and second wedge members having contiguous bevelled side surfaces are mounted in the aligned first and second slots. The first wedge member is rigidly attached to the first gear, and the second wedge member is moveably attached thereto. The second wedge member is attached to the first gear by means of a fastener extending through an oversized hole therein and threadably engaging a second threaded hole in the back wall of the first slot. A Belleville spring washer is mounted between the second wedge member and a side wall of the second slot of the second gear. Thus, as the second wedge member is moved toward the back wall of the first slot in the first gear by rotation of the fastener the second gear is rotated in relationship thereto misaligning the gear teeth eliminating any play between the gear assembly and any mating gear.

7 Claims, 2 Drawing Sheets

ANTI-BACKLASH GEAR ASSEMBLY

TECHNICAL FIELD

The invention relates to the field of anti-backlash gear assemblies and, in particular, to one that provides for the take-up of clearance between meshing gear teeth after installation.

BACKGROUND INFORMATION

It is necessary in mechanisms which require accuracy of operation, such as lathes, milling machines, indexing machines and numerous other machine tools, to provide some sort of anti-backlash mechanism in the gear train, so that repeatable positioning or indexing of the cutting tool is obtainable. Prior art methods typically use split gears with some sort of spring device to bias the gears in opposite rotational directions about a common shaft. The problem with such spring-loaded split gear configurations, is that the spring force must be overcome when installing the gear assembly i.e., engaging mating gears. This may be difficult to accomplish if the spring loads are large.

A more sophisticated approach can be found in U.S. Pat. No. 4,072,064 when installing "Anti-Backlash Gear Assembly" by W. D. Lloyd. Here, the anti-backlash gear assembly includes a hydraulic piston that automatically maintains clearance filling positioning of two circumferentially and axially adjustable segments of a split gear. However, this device is complicated and expensive when compared to simple spring biasing system.

Another approach can be found in U.S. Pat. No. 3,803,936 "Adjustable Herringbone Gears for use in Embossing, Engraving, and the Like" by B. Kroeper. This invention relates to a set of herringbone gears for use in a rotary embossing and engraving aperatus. One of the gears has three segments with an adjustable center segment in order to obtain positive contact between the teeth on the adjustable center segment and the teeth of the mating gear to prevent backlash and longitudinal side trust on the gears. A cam shaft is mounted in a hole, extending through the center and side gear segments having a cam lobe located in the center segment. Rotation of the cam shaft causes the cam lobe to engage and position the center segment. With this system, once the prepositioning is accomplished by the cam, no variation is possible. Thus, if this type of anti-backlash gear assembly were mated with a rack gear which varied in distance from the center line of the gear assembly, slack would appear as the gear traversed the rack gear causing a binding or loss of the anti-backlash feature. Most of their problems were solved in Applicant's co-pending U.S. patent application, Ser. No. 074,653 "Anti-Backlash Gear Assembly", filed July 17, 1987, wherein the amount of biasing force can be varied However, the torque necessary to adjust the biasing force is somewhat proportional thereto. Other patents of interest are U.S. Pat. No. 2,880,625 "Backlash Compensator" by A. G. Thomas, U.S. Pat. No. 4,582,360 "Hinge for Seat with Adjustable Backrest, Particularly Power Vehicle Seat" by P. Becker, U.S. Pat. No. 2,703,497 "Biasing Mounting" by V. G. Townsend, U.S. Pat. No. 2,679,167 "Antibacklash Device" by D. B. Nichinson, U.S. Pat. No. 4,305,307 "Anti-Backlash Gear Drive" by P. C. Kiunke, and U.S. Pat. No. 2,382,846 "Differential Gearing" by C. C. Barber.

Thus, while there are numerous anti-backlash gear assemblies available, none provide the combination of simple spring biasing, means for relieving the biasing effect for installing the anti-backlash gear assembly, and means for adjusting the amount of anti-backlash force, in one simple, reliable and inexpensive assembly.

Therefore, it is a primary object of the subject invention to provide an anti-backlash gear assembly of the split-gear type wherein the gears are spring biased apart.

It is another object of the subject invention to provide an anti-backlash gear assembly wherein the gear assembly is easily mated with other gears without the need for overcoming the anti-backlash biasing force.

It is a further object of the subject invention to provide an anti-backlash gear assembly wherein the amount of biasing force can be varied.

It is still a further object of the subject invention to provide an anti-backlash gear assembly wherein the amount of biasing force can be varied and the means to vary the biasing force is essentially insensitive thereto.

DISCLOSURE OF THE INVENTION

The invention is an anti-backlash gear assembly. In detail, the gear assembly comprises a first gear rigidly mounted to a shaft and which incorporates a first slot partially therethrough aligned with the longitudinal axis of the shaft. A second gear is rotatably mounted to the shaft and has a second slot extending completely therethrough which is alignable with the first slot.

First and second wedge members having contiguous bevelled side surfaces are mounted in the aligned first and second slots. The first wedge member is rigidly attached to the first gear by means of a fastener which extends completely through the wedge member and engages a threaded hole located in the back wall of the first slot. The fastener is torqued to a level such that the first wedge member is firmly contacting the back wall of the first slot. Additionally, the first wedge member incorporates a protrusion on the side opposite the bevelled side surface which engages a side wall of the first slot, further positioning the wedge member. The second wedge member is moveably attached to the first gear by means of a second fastener extending through a hole therein, and threadably engaging a second threaded hole in the back wall of the first slot. However, the hole in the second wedge member is oversized allowing sideways motion of the second wedge member.

Thus, as the second fastener is torqued, the second wedge member will be moved inward towards the back wall of the slot. Since the contiguous bevelled surfaces are in slideable contact, it will also translate to the side.

A biasing means, preferably a Belleville spring washer, is mounted between the side opposite the bevelled surface of the second wedge member and a side wall of the second slot of the second gear. Preferably, this opposite side incorporates a protrusion which extends through the center hole of the Belleville spring washer positioning it against the side wall of the second slot.

Thus, as the second wedge member is moved toward the back wall of the first slot in the first gear by rotation of the fastener therethrough, the contiguous bevelled surfaces slide against each other forcing the second wedge member toward the side wall of the second slot compressing the Belleville spring. With the first wedge member rigidly attached to the first gear, the second gear is rotated in relationship thereto misaligning the gear teeth eliminating any play between the teeth of the first and second gears with any mating gear thereto.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for the purposes of illustration and description only and are not intended as a definition of the limits of the invention.

BRIEF DESCRIPTION OF THE DRAWINGS

Illustrated in FIG. 1 is a perspective view of the anti-backlash gear assembly coupled to a rack gear.

Illustrated in FIG. 2 is an enlarged partial cross-sectional view, of the anti-backlash gear assembly shown in FIG. 1, taken along the line 2—2.

Figure 1:
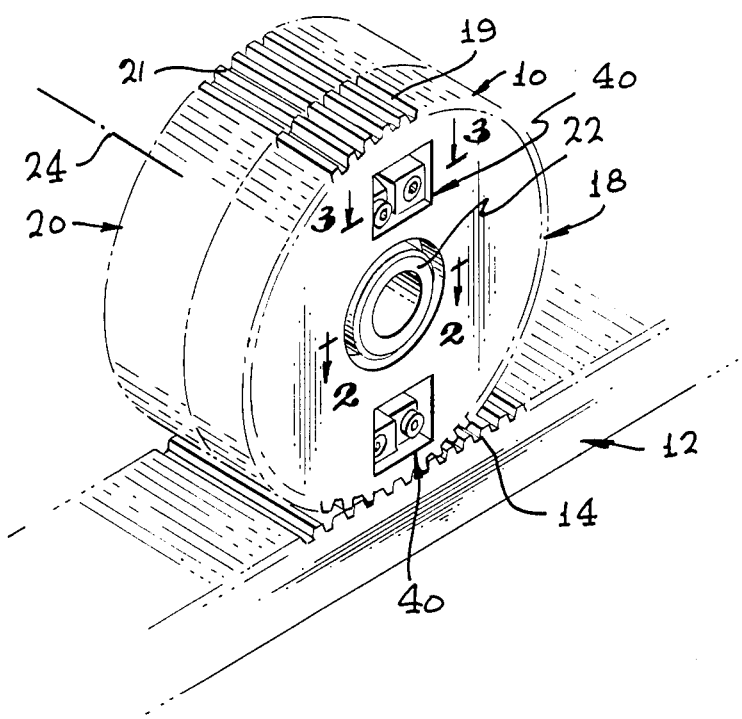
Figure 3:
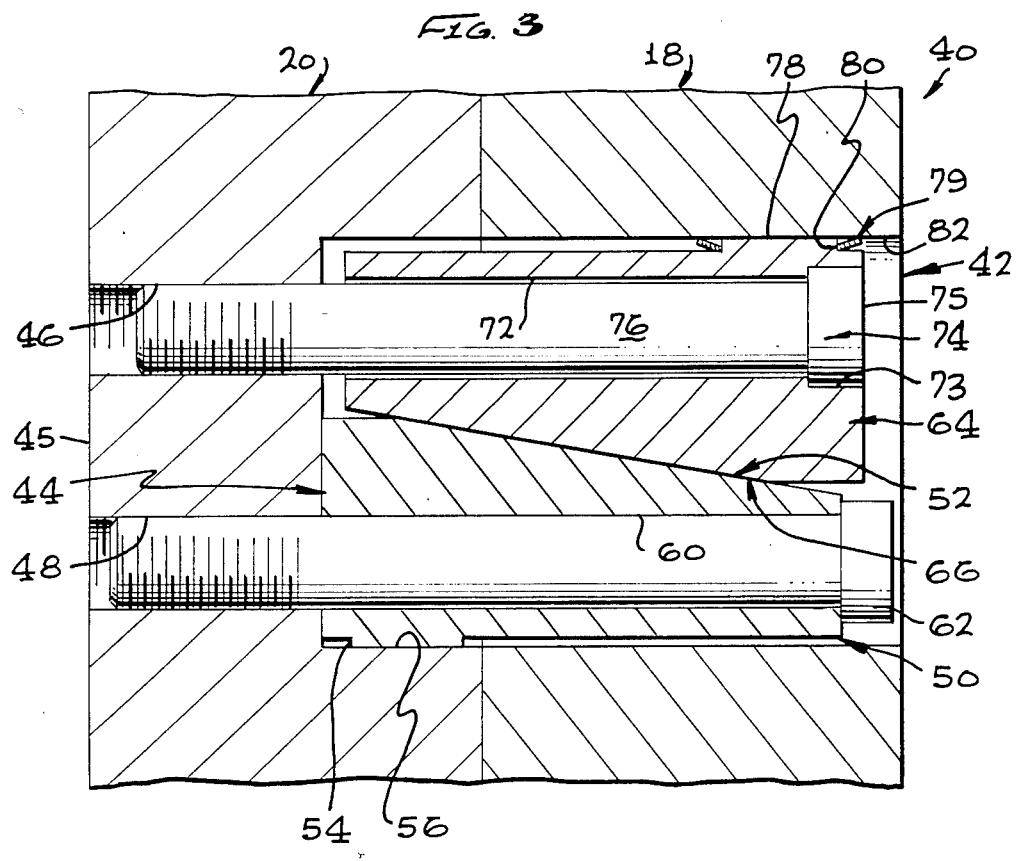

Illustrated in FIG. 3 is an enlarged partial cross-sectional view of the anti-backlash gear assembly shown in FIG. 1, taken along the line 3—3.

Figure 4:
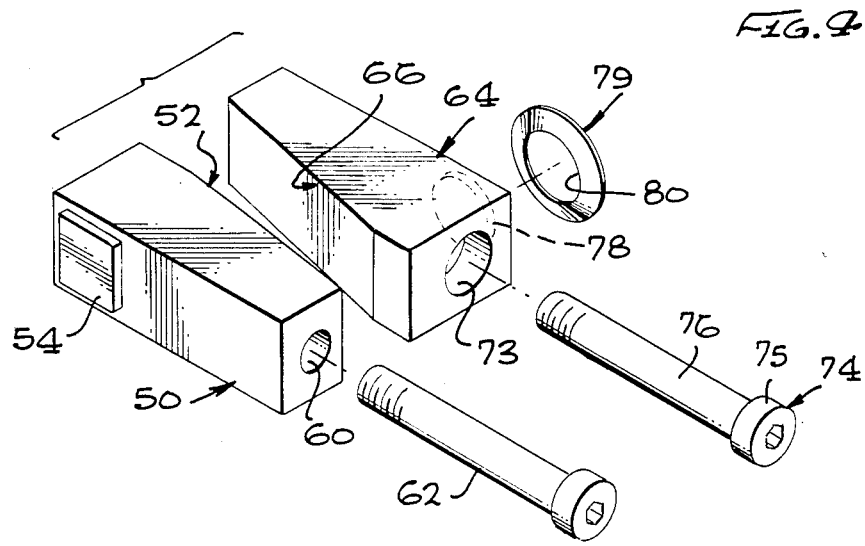

Illustrated in FIG. 4 is an exploded perspective view of a portion of the anti-backlash gear assembly shown in FIG. 1; particularly illustrating the anti-backlash mechanism.

BEST MODE FOR CARRYING OUT THE INVENTION

Figure 2:
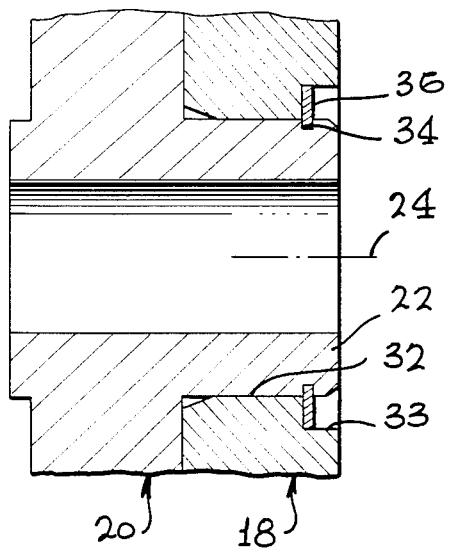

Illustrated in FIG. 1 is a perspective view of the anti-backlash gear assembly in conjunction with a rack gear while illustrated in FIG. 2 is a partial cross-sectional view of the anti-backlash gear assembly shown in FIG. 1 taken along the line 2—2. Referring to FIGS. 1 and 2 it can be seen that the anti-backlash gear assembly indicated by numeral 10, is typically coupled to other gears and, as illustrated in FIG. 1, a rack gear 12 having teeth 14. The gear assembly 10 basically comprises a first gear 18 having teeth 19 in engagement with the teeth 14 of the rack gear 12 and gear 20 having teeth 21, also engaged with rack gear teeth. Gear 20 includes a shaft 22 having an axis of rotation 24. The gear 18 has an internal aperature 32 with a counterbore 33 for rotatably mounting the gear 18 to the gear 20. The shaft 22 includes a groove 34 which is aligned with the counterbore 33, such that the gear 18 can be locked to the gear 20 by means of snap ring 36. Thus, the gear 18 and 20 can rotate in relation to each other about the axis of rotation 24.

The gear assembly 10 incorporates two anti-backlash mechanisms, both of which are designated by the numeral 40, one of which is illustrated in detail in FIGS. 3 and 4. The mechanism 40 comprises a first slot 42 in the gear 18 extending completely therethrough and aligned with the longitudinal axis of rotation 24. A second slot 44 is machined partially through the gear 20 having a backwall 45. A pair of threaded holes 46 and 48 are located in the back wall 45 (the purposes of which will be subsequently discussed). A first wedge member 50 is mounted in the slots 42 and 44 having a bevelled side surface 52 and a protrusion 54 on the opposite side in contact with the side wall 56 of the slot 44. The wedge member 50 includes a through hole 60 in which is mounted a fastener 62 that threadably engages hole 48, and, along with protrusion 54, locks the wedge member 50 in place.

A second wedge member 64 is also mounted in slots 42 and 44 having a second bevelled side surface 66 contiguous with surface 52 of wedge member 50 and therefore in slideable contact therewith. The second wedge member 64 includes a through hole 72 with a counterbore 73 in which is mounted a fastener 74 threadably engaging hole 46 in the back wall 45. The fastener 74 includes a head portion 75 and a shank portion 76 with the shank portion 76 having a diameter substantially less than the diameter of the hole 72 Thus, as the fastener 74 is rotated, causing the wedge member 64 to move toward back wall 45 of the slot 44 it also slideable engages surface 52 and translates sideways. The wedge member 64 further includes a protrusion 78 which is used to support a Belleville spring washer 79, i.e., the center hole 80 of the washer 79 fits over the protrusion 78. Thus, the washer 79 is in contact with side wall 82 of the slot 42.

Therefore, as the fastener 74 is rotated in a direction causing the wedge member 64 to travel inward towards the back wall 45 of the slot 44, the wedge member 64 also moves sideways toward wall 82 causing the Belleville spring washer 79 to compress. This, of course, causes gear 18 to rotate in relationship to gear 20, in turn causing the teeth thereof (teeth 19 and 21), to misalign and contact facing sides of adjacent teeth of the rack gear (best illustrated in FIG. 1). Thus, to install the gear assembly the wedge members 64 is adjusted to provide little or no biasing force and once in place (such as in engagement with a rack gear as illustrated in FIG. 1) the wedge member 64 is readjusted to provide the biasing force.

Therefore, the desired purposes of the invention are obtained as follows:

(1) Ease of assembly since gear teeth loading is accomplished after mating to other gears.

(2) The load on the teeth can be varied.

(3) A biasing load is applied so that misalignment or wear can be accommodated.

(4) Because of the use of wedge members, the torque necessary to translate the wedge members is almost totally insensitive to the amount of biasing force applied because of the large mechanical advantage being obtained by the use of the wedge design.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

Industrial Applicability

The anti-backlash gear assembly has application to all mechanisms wherein precise and repeated positioning of components is a necessity.

I claim:

1. An anti-backlash gear assembly comprising:
   a shaft having a longitudinal axis;
   a first gear mounted to said shaft having a first slot substantially aligned with said longitudinal axis;
   a second gear rotatably mounted to said shaft having a second slot alignable with said first slot;
   first and second wedge members having contiguous bevelled side surfaces mounted in said first and second slots, said first wedge member rigidly attached to said first gear and said second wedge member moveably attached to said first gear; and biasing means mounted between said second wedge member and one of the side walls of said second slot for urging said second wedge member toward said first wedge member.

2. The gear assembly as set forth in claim 1, wherein said biasing means is mounted between the side opposite said bevelled side surface of said second wedge member and said one side wall of said second side slot.

3. The gear assembly as set forth in claim 2 wherein:
said first slot extends only partially through said first gear and includes a back side wall facing said second slot; and
said second slot extending completely through said second gear.

4. The gear assembly as set forth in claim 3, wherein:
said back wall of said first slot includes a threaded hole therein;
said first wedge member includes a hole therethrough from a first end to a second end; and
a fastener having a head portion in contact with said first end of said first wedge member and a shank portion extending through said hole in first wedge member and threadably engaging said threaded hole in said back wall of said first slot ridgedly attaching said first wedge member to said first gear.

5. The gear assembly as set forth in claim 4 wherein said first wedge member includes a protrusion extending from the side opposite said bevelled side surface in contact with a side wall of said first slot.

6. The gear assembly as set forth in claim 5 wherein:
said biasing means is a Belleville spring washer; and
the side opposite said Belleville surface of said second wedge member includes a protrusion adapted to fit through the center hole of said Belleville spring washer positioning said washer against said side wall of said second slot.

7. The gear assembly as set forth in claim 6 wherein:
said back wall of said first slot further includes a second threaded hole therein;
said second wedge member includes a hole therethrough extending from a first end to a second end thereof; and
a second fastener having a head portion in contact with said first end of said second wedge member and a shank portion extending through said hole of said second wedge member and threadably engaging said second threaded hole of said back wall of said second slot, said shank portion of said second fastener having a diameter substantially less than the diameter of said hole through said second wedge member;
such that when said second fastener is rotated in a direction causing said second wedge member to move in a direction towards said first wedge member said continuous bevelled surfaces slide over each other forcing said second wedge member towards said side wall of said second slot such that said spring washer is compressed biasing said first and second gears apart.

* * * * *